United States Patent
Klos et al.

(10) Patent No.: US 7,379,448 B2
(45) Date of Patent: May 27, 2008

(54) AUTOMATED METHOD AND SYSTEM FOR SELECTIVELY UPDATING COMMUNICATIONS PARAMETERS REPRESENTING SUBSCRIBER SERVICES IN TELECOMMUNICATIONS NETWORKS

(75) Inventors: Tim R. Klos, High Ridge, MO (US); John A. Vallely, Florissant, MO (US); Cynthia P. Green, Carol Stream, IL (US); Rebecca A. Trehy, St. Louis, MO (US)

(73) Assignee: SBC Knowledge Ventures, L.P., Reno, NV (US)

( * ) Notice: Subject to any disclaimer, the term of this patent is extended or adjusted under 35 U.S.C. 154(b) by 728 days.

(21) Appl. No.: 10/978,185

(22) Filed: Oct. 29, 2004

(65) Prior Publication Data

US 2006/0092981 A1    May 4, 2006

(51) Int. Cl.
*H04L 12/66* (2006.01)
*H04J 3/16* (2006.01)

(52) U.S. Cl. ...................................... 370/352; 370/465
(58) Field of Classification Search ..................... None
See application file for complete search history.

(56) References Cited

U.S. PATENT DOCUMENTS

| | | | |
|---|---|---|---|
| 5,434,798 A | 7/1995 | Madebrink et al. | |
| 6,014,715 A * | 1/2000 | Stoevhase | 710/11 |
| 6,272,108 B1 | 8/2001 | Chapman | |
| 6,393,478 B1 | 5/2002 | Bahlmann | |
| 2002/0087580 A1 | 7/2002 | LaCroix et al. | |
| 2002/0144156 A1* | 10/2002 | Copeland, III | 713/201 |
| 2002/0161867 A1 | 10/2002 | Cochran et al. | |
| 2002/0198967 A1 | 12/2002 | Iwanojko et al. | |
| 2003/0037171 A1 | 2/2003 | Madineni et al. | |
| 2003/0061323 A1 | 3/2003 | East et al. | |
| 2003/0091002 A1 | 5/2003 | Oliver et al. | |
| 2003/0093506 A1 | 5/2003 | Oliver et al. | |
| 2003/0140132 A1 | 7/2003 | Champagne et al. | |
| 2003/0148774 A1* | 8/2003 | Naghian et al. | 455/456 |
| 2004/0028037 A1* | 2/2004 | Rasanen et al. | 370/354 |
| 2004/0064555 A1* | 4/2004 | Cuny et al. | 709/225 |
| 2004/0073600 A1* | 4/2004 | Elo et al. | 709/201 |
| 2004/0093418 A1* | 5/2004 | Tuomi | 709/228 |
| 2004/0103125 A1 | 5/2004 | Kasper, II | |
| 2005/0025292 A1* | 2/2005 | Ganani et al. | 379/88.16 |
| 2005/0047337 A1* | 3/2005 | Virtanen | 370/229 |
| 2007/0204050 A1* | 8/2007 | Liu et al. | 709/230 |

* cited by examiner

*Primary Examiner*—Andrew C. Lee
(74) *Attorney, Agent, or Firm*—Brooks Kushman P.C.

(57) ABSTRACT

Methods and systems for updating subscriber service parameters in a communications network wherein a central provisioning unit automatically locates subscriber ports having subscriber service parameters that require updating and which automatically issues commands for updating the subscriber service parameters of the ports requiring updating.

25 Claims, 2 Drawing Sheets

AUTOMATED METHOD AND SYSTEM FOR SELECTIVELY UPDATING COMMUNICATIONS PARAMETERS REPRESENTING SUBSCRIBER SERVICES IN TELECOMMUNICATIONS NETWORKS

BACKGROUND OF THE INVENTION

1. Field of the Invention

The present invention relates to methods and systems for updating subscriber service parameters in a communications network.

2. Background Art

In a data or voice communications network it may become necessary to perform mass-updates that change subscriber services. For data networks, the subscriber service parameters associated with data circuits are typically changed using a Graphical User Interface (GUI) or using a Command Line Interface (CLI). When the network serves a moderate number of users, these interfaces are adequate. However, in large networks supporting thousands or millions of subscribers changing the subscriber service parameters cannot be efficiently done through manual processes using these interfaces.

In a data network that provides Digital Subscriber Line (DSL) services, for example, it may be necessary to perform these mass updates based upon a set of specific selection criteria. These criteria may include specific circuits or circuits that have a common characteristic. Typical of this type of update is the requirement to change Discrete Multi-Tone (DMT) parameters that represent such DSL characteristics as data speeds, noise margins, channel interleave delays, power spectral densities, etc., from one set of values to another. The changes may be the result of new services or may be required to enhance network performance.

Since it is not feasible to perform these changes one at a time or in any manual mode using known utilities, a utility is needed that overcomes these deficiencies.

DETAILED DESCRIPTION OF THE PREFERRED EMBODIMENT(S)

In a system having thousands, if not millions, of subscriber stations, it can be a burden to locate subscriber service parameters associated with the subscriber ports requiring updating. One advantage of the present invention is that it ameliorates this problem by providing a central provisioning unit to automatically locate the subscriber ports requiring updating.

Furthermore, in such systems, it can be a burden to update the subscriber service parameters of the subscriber ports requiring updating. One advantage of the present invention is that it ameliorates this problem by providing a central provisioning unit to automatically update the subscriber ports requiring updating.

The above features and advantages, along with other features and advantages of the present invention, are readily apparent from the following detailed description of the invention when taken in connection with the accompanying drawings.

Figure 1:
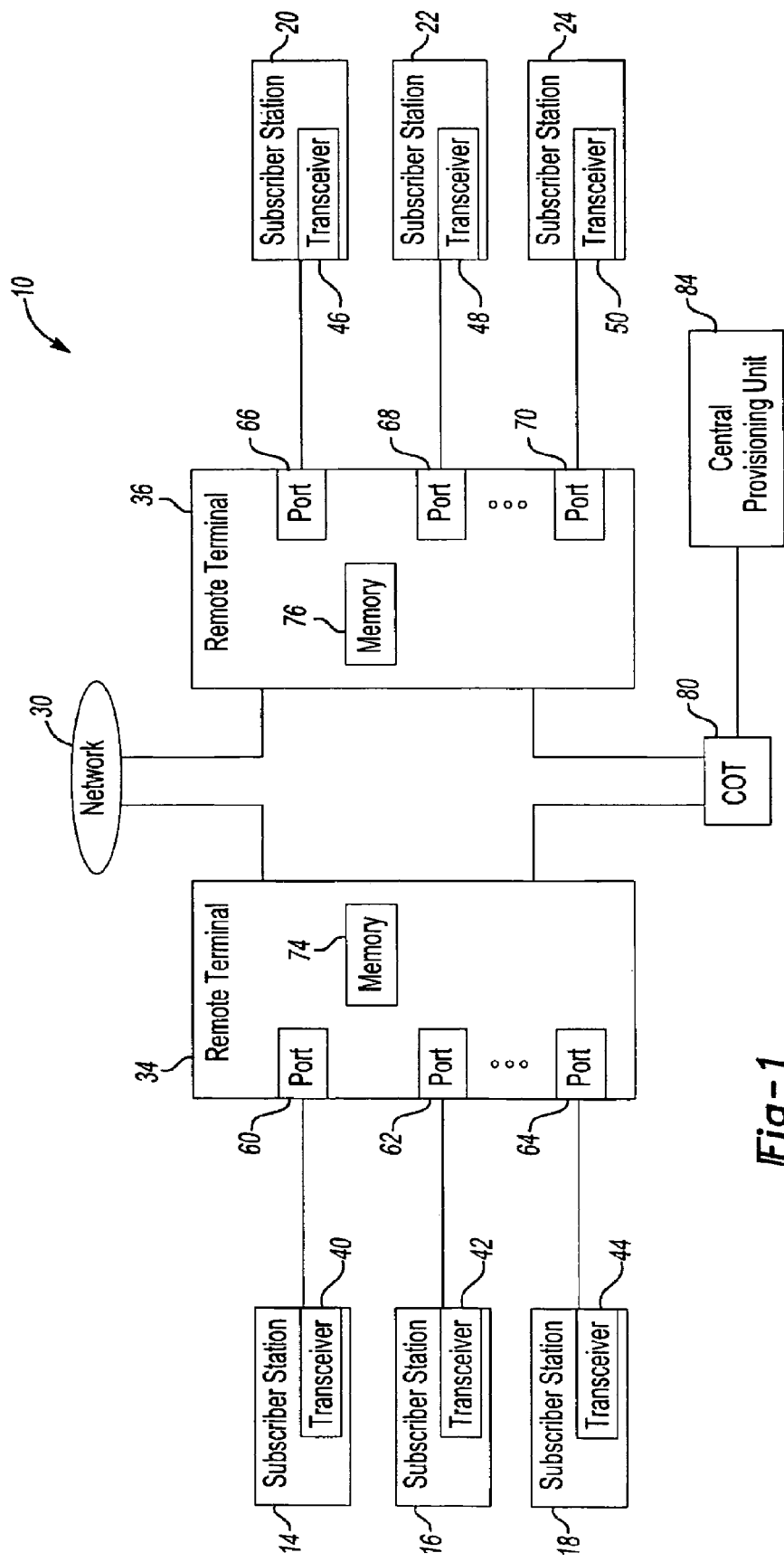
FIG. 1 illustrates a communication system in accordance with one aspect of the present invention.

FIG. 1 illustrates a communication system 10 in accordance with one aspect of the present invention. The communication system 10 generally relates to a telephone communication system wherein voice and data services are provided over telephone lines to a number of subscriber stations 14-24.

In more detail, the subscriber stations 14-24 correspond with subscriber homes, offices, buildings, and the like which receive voice and/or data services from a telephone service provider through a network 30. A number of subscriber stations 14-24 are grouped together for servicing with a number of remote terminals 34-36. The subscriber stations 14-24 include one or more transceivers 40-50 or other devices for exchanging signals with the remote terminals 34-36.

The signals exchanged with the remote terminals 34-36 may correspond with voice, data, or other types of electronic signals. Each remote terminal 34-36 is configured for communication with the network 30 so that signals may be communicated between the network 30 and the subscriber stations 14-24 by way of the remote terminals 34-36. The network 30 shown in FIG. 1 is generalized as the present invention contemplates utilizing the remote terminals 34-36 to exchange signals with any network. In one aspect of the present invention, the network 30 may be logically separated into voice and data networks wherein voice signals are exchanged over one portion of the network 30 and data signals are exchanged over a data portion of the network 30.

For example, the voice portion of the network 30 may correspond with a public telephone switching network (PSTN) and the data portion of the network 30 may correspond with a wide area network (WAN), such as the Internet, a local area network (LAN), or other type of data network. For operation with this type of voice and data network, the remote terminals 34-36 may be configured to separate voice and data signals and route the signals to different exchanges associated therewith. The present invention, however, contemplates that the remote terminals 34-36 may include features, logic, and other items which are not shown in order to permit exchanging signals between the subscriber stations 14-24 and the network 30, depending on the type of network employed.

Each remote terminal 34-36 includes a port 60-70 for each subscriber station 14-24 supported thereby. The ports 60-70 are configured for providing electrical connections between the subscriber stations 14-24 to the remote terminals 34-36. The ports 60-70 may be denoted as 'virtual circuits' because operating characteristics of the circuits may be programmed by the remote terminals 34-36 and devices in communication therewith. In particular, the operating characteristics may specify signal rates, voice and data channels, transmission protocols, and other parameters for controlling and operating the exchange of signals between each remote terminal 34-36 and its associated subscriber station 14-24.

In accordance with one aspect of the present invention, the operating characteristics are generally referred to as subscriber service parameters as the subscriber service parameters define the operating characteristics for each port 60-70. For example, a first subscriber station may request data access at a first data rate and a second subscriber station may request data access at a second, different data rate such that the subscribers are said to have different subscriber service parameters as the parameters specify the type of subscriber service requested by the subscriber stations. This is common is telecommunication networks where some subscriber stations may request high speed data connections while other subscriber stations request less than high speed data connections.

Memories 74-76 or other devices are preferably included on each remote terminal for storing the operating parameters associated with each port 60-70. The memories 74-76 preferably include a table or other accessible data compilation for each port 60-70 so that a processor or other feature (not shown) on the remote terminals 34-36 may access the memories 74-76 to determine the operating parameters for each port 60-70. The memories 74-76 are preferably segmented or otherwise assignable to each port 60-70 so that different ports 60-70 on the same remote terminal 34-36 may include different operating parameters. Preferably, the remote terminals 34-36 construct the virtual circuits according to the operating characteristics stored on the memories 74-76. The present invention, however, contemplates that the memories 74-76 may be located remotely from the remote terminals 34-36, such as on a database (not shown), such that the remote terminals 34-36 must access the database or receive instructions from another device in communication with the database to receive the operating characteristics for the ports 60-70.

The system preferably further includes one or more central office terminals (COT) 80. The COT 80 is preferably a communication medium of the telecommunications system provider or other provider of the system 10 that provides command and control of the remote terminals 34-36 In some environments, the remote terminals 34-36 are provided by one or more vendors such that the telecommunications system provider utilizes the COT 80 to provide command and control signals to the various remote terminals according to the control architecture of the vendor associated therewith. Likewise, some remote terminals may include legacy configurations or simply different configurations than some of the other remote terminals such that the COT 80 may be used to provide the command and control signals required for commanding and control these remote terminals.

In general, a single COT 80 supports a number of remote terminals 34-36, typically by geographical area. The remote terminals 34-36 in turn support a greater number of subscriber stations 14-24 so that a centralize architecture is provided by way of the COTs 80 and remote terminals 34-36 for supporting any number of subscribers. In particular, the system 10 may comprise a large geographical area, such as the United States, and include a number of COTs 80 to support a larger number of remote terminals 34-36 which support a larger number of subscriber stations 14-24, such as the millions of subscriber stations in the United States.

In accordance with one aspect of the present invention, each COT 80 communicates with a central provisioning unit 84. The central provisioning unit 84 is a source for command and control of the COTs 80, and thereby the remote terminals 34-36. The central provisioning unit 80 is preferably configured to set the subscriber service parameters for each port 60-70 from a centralized location without requiring manual interaction or specification of the ports 60-70. The COT 80 is preferably a unit provided by the vendor of the COT 80 for supporting operation of the remote terminals 34-36.

The system 10 may include any number of subscriber stations 14-24, remote terminals 34-36, and COTs 80. To facilitate command and control, each of these items preferably includes an identifying address or other feature for addressing signals thereto. Preferably, each COT 80 is assigned an Internet Protocol (IP) address, each remote terminal 34-36 is assigned a terminal identification (TID) address, each port 60-70 is assigned an access identifier (AID), and each subscriber station 14-24 is addressed a subscriber station identification (SSID) address.

The system 10, as described above, generally relates to a telecommunications system wherein telephone lines deliver signals between the remote terminals 34-36 and the subscriber stations 14-24. The present invention, however, is not so limited. Rather, the present invention contemplates any number of communication mediums for exchanging signals, including, RF and satellite wireless systems, cable systems, and the like. In addition, the present invention is not limited to system having both voice and data capabilities. Rather, the present invention contemplates system having only data capabilities.

Figure 2:
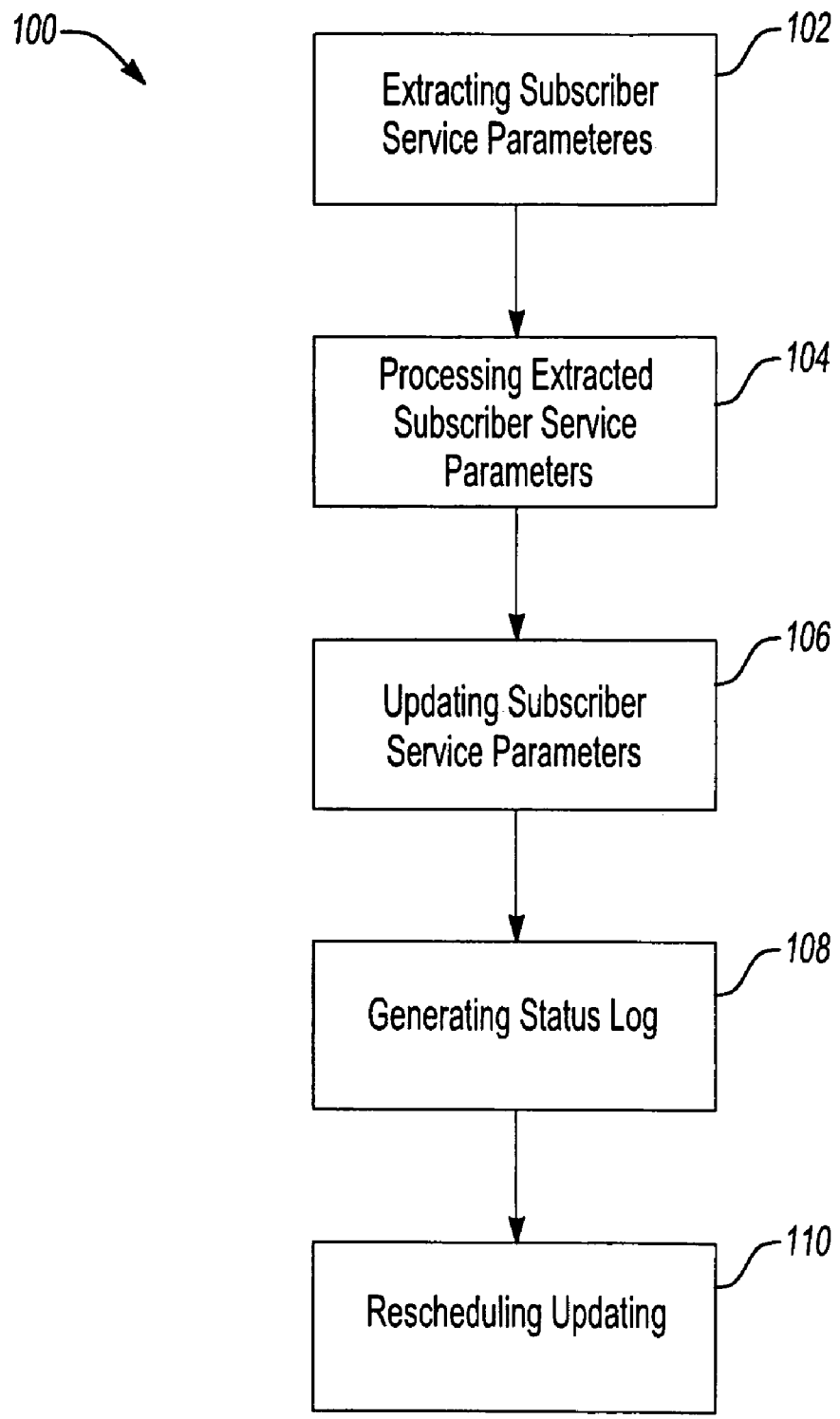
FIG. 2 illustrates a flowchart of a method for updating subscriber services in accordance with one aspect of the present invention.

FIG. 2 illustrates a flowchart 100 of a method for updating subscriber services in accordance with one aspect of the present invention. The method is advantageous for limiting manual interaction and other labor intensive operations previously required for updating subscriber service parameters. In more detail, the method generally relates to a method for executing a software program or other logic from a central provisioning unit for independently updating subscriber service parameters by updating ports in a remote terminal.

Block 102 relates to extracting subscriber service parameters for one or more subscriber stations. As described above, the subscriber service parameters specify the operating parameters for the ports associated with the subscriber stations so as to define the virtual circuits between the subscriber station and its associated remote terminal, such as to define its data transfer rate.

The subscriber service parameters are preferably automatically extracted by the central provisioning unit according to extraction criteria. The extraction criteria is preferably inputted to the central provisioning unit by a user or provided thereto by another entity. The extraction criteria may specify any number or parameters, such as data transfer rates, data transfer protocols, and identifying address, such as the IP, TID, AID and/or SSID addresses assigned to each item in the system.

After receipt of the extraction criteria, the central provisioning unit automatically determines the subscriber stations matching the extraction criteria and determines the subscriber service parameters and other data associated therewith for each of the matching subscriber stations, such as its address and the address of the port, remote terminal, and COT associated therewith. In addition, other pieces of data may be retrieved for each subscriber station, such as device type information. The device type information specifies protocol instructions and other parameters for the port that are required for communication with the subscriber stations, which may be advantageous in system having remote terminals supplied by a number of vendors or remote terminals with different control architectures.

The data may be extracted in a number of operations. In accordance with one aspect of the present invention, the central provisioning unit preferably includes a provisioning database having the subscriber service parameters and addresses associated with each subscriber such that the database is scanned to locate subscriber stations matching the extraction criteria. In accordance with another aspect of the present invention, the central provisioning unit may poll the system, such as by polling the memories of the remote terminals in the system to locate subscriber stations matching the extraction criteria.

Block 104 relates to processing the extracted subscriber service parameters in the central provisioning unit. The processing of the extracted subscriber service parameters generally relates to comparing the extracted subscriber service parameters to an updated set of subscriber service parameters, generally referred to as updated subscriber service parameters.

If the extracted subscriber service parameters fail to match the updated subscriber service parameters, the subscriber station associated therewith requires updating of its subscriber service parameters, i.e. the operating characteristics of its port, so that the subscriber service parameters match. There are any number of reasons for updating or changing the subscriber service parameters, such as in response to system upgrades and/or customer requests.

In a system having thousands, if not millions, of subscriber stations, it can be a burden to locate the subscriber service parameters of the subscriber ports requiring updating. The present invention ameliorates this problem by providing the central provisioning unit to automatically locate the subscriber ports requiring updating, i.e., by locating the subscriber stations ports having subscriber service parameters that fail to match the extraction criteria.

Block 106 relates to automatically updating the subscriber service parameters of the subscriber port requiring updating. The updating of the subscriber service parameter generally relates to the central provisioning unit issuing commands therefrom to the remote terminals associated with the subscriber ports requiring updating.

The updating commands include instructions provided by the central provisioning unit that specify the subscriber service parameters which require updating and/or the instructions may define where the updated subscriber service parameters may be located. For example, if the instructions include the updated subscriber service parameters, the remote terminals simply read the instructions for the updated subscribe service parameters and make the corresponding adjustments. If, however, the instructions merely specify where the updated parameters are stored, such as on a system database, the remote terminals must contact the system database themselves to determine the updated subscriber service parameters, or the system database may initiate communication with the remote terminal to facilitate migration of the parameters to the remote terminal.

The central provisioning unit is preferably configured to output the updating instructions according to a number of different protocols so that the central provisioning unit may support multiple types of remote terminals. Preferably, the extracted subscriber service parameters include device type information and/or other data for assisting the central provisioning unit in formatting and constructing the updating commands into protocols understood by the various remote terminals. In some cases, the central provisioning unit may need to issue multiple updating commands in order to support the various protocols, i.e., if a single COT supports remote terminals having different control architectures.

The commands may be issued in a number of different operations. In one aspect of the present invention, the commands are preferably grouped according to the identifying addresses. For example, if multiple subscriber stations are associated with the same IP address, i.e. the subscriber stations are serviced by the same COT, the central provisioning unit preferably issues commands in a single telnet session with the corresponding COT for updating the subscriber service parameters of the associated subscriber stations. In this manner, the number of commands issued to each COT may be limited so as to limit command traffic and unnecessary overlap. Preferably, the updating commands are addressable from the COT to individual AIDs addresses of the ports so that each port on each remote terminal may be independently updated, i.e. without requiring all ports on the remote terminals to be updated. However, the present invention is not limited to grouping the ports for updating and contemplates that the ports may be updated in a different manner, including issuing signals to each remote terminal and/or port address.

In accordance with one aspect of the present invention, the ports on each remote terminal having more than one port requiring updating are preferably sequentially updated if the number of ports requiring updating exceeds the number of ports that may be updated at one time. In more detail, the remote terminal may be limited to updating only a portion of the ports at one time, generally due to processing restrictions. As such, the present invention issues commands from the central provisioning unit for sequentially updating the remote terminal by issuing a first set of updating commands, and after a predefined period of time, issuing another second set of updating commands. The predefined period of time is selected by the central provisioning unit to correspond with an update processing time of the remote terminal such that the first portion of ports are completely updated according to the first set of updating signals prior to beginning the updating the second portion of the ports with the second set of updating commands.

In accordance with one aspect of the present invention, ports may be omitted from the automatic updating according to omission criteria. The omission criteria is preferably inputted into the central provisioning unit by a user or other entity in communication therewith. It may include any number of parameters, such as those described above with respect to the extraction criteria, and other parameters. The other parameters are preferably ascertained by the central provisioning unit scanning a database of pending updates and hardware issues. In more detail, the central provisioning unit preferably logs all updating operations and hardware issues in a database so that it may be consulted to determine the status of each subscriber station. In some cases wherein thousands or millions of subscriber ports are being updated, a request for updating the subscriber ports may be instigated before previous updates are complete such that the previous updates are still pending. The present invention notes the pending updates and eliminates them from subsequent updates. In addition, the present invention consults the database to determine remote terminals and COTs having hardware issues or problems and eliminates these from updating until they are back online.

In a system having thousands, if not millions, of subscriber stations, it can be a burden to update the subscriber service parameters of the subscriber ports requiring updating. The present invention ameliorates this problem by providing the central provisioning unit to automatically update the subscriber ports requiring updating.

Block 108 relates to generating a status log for the subscriber stations. The status log is preferably stored on a status database which communicates with the central provisioning unit. In accordance with one aspect of the invention the status log is preferably generated by the central provisioning unit polling the ports in the system and storing the subscriber service parameters associated therewith to determine its current subscriber service parameters so that these parameters may then be compared to the update parameters to determine if the subscriber service parameters were successfully updated. In yet another aspect of the invention, the status log is updated when any update command fails to successfully perform its intended function. If the parameters fail to match, then an error log database of the central provisioning unit is preferably updated with an error message to reflect the discrepancy. If the parameters match, the status log is preferably also updated to indicate the matching status.

Block 110 relates to rescheduling updating of the subscriber service parameters for the ports having an error log recorded in the status log. The subscriber service parameters are updated in the manner described above. The rescheduling is preferably automatically scheduled to occur after a predefined period of time passes once the updating in block 106 is complete.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for updating subscriber services in a system having a number of remote terminals associated with a number of subscriber stations, the remote terminals for relaying signals between a network and the subscriber stations according to subscriber service parameters, the method comprising:

extracting subscriber service parameters for a number of subscriber stations with a central provisioning unit;

processing the extracted subscriber service parameters with the central provisioning unit to determine one or more subscriber stations requiring updating;

automatically updating the subscriber service parameters associated with the subscriber stations requiring updating to correspond with the updated subscriber service parameters with commands issued from the central provisioning unit and without requiring manual interaction to associate the updated subscriber service parameters with specific subscriber stations;

wherein each remote terminal includes a port for each subscriber station associated therewith for relaying signals between the communication network and the associated subscriber station, wherein the subscriber service parameters for each subscriber station specify operating characteristics for the port associated therewith, and wherein updating the subscriber service parameters includes updating the operating characteristics of the port associated with each subscriber station requiring updating;

wherein the remote terminals include a number of ports and wherein updating the subscriber service parameters includes updating at least a portion of the ports included on one or more remote terminal; and sequentially updating the subscriber service parameters of each port of one of the remote terminals, wherein the sequential updating is characterized by updating a first portion of the ports and thereafter updating at least a second portion of the ports after a predefined period of time.

2. The method of claim 1 further comprising selectively determining the ports on each remote terminal for updating the subscriber service parameters associated therewith.

3. The method of claim 1 further comprising automatically selecting the predefined period of time with the central provisioning unit based on an updating interval required for updating the first portion of the ports such that updating of the first portion of the ports is completed before beginning updating of the second portion of the ports.

4. The method of claim 1 wherein automatically updating the subscriber service parameters includes selectively issuing commands from the central provisioning unit for independently updating selected ports of one or more remote terminals.

5. The method of claim 1 further comprising determining the subscriber stations requiring updating if the extracted subscriber service parameters associated therewith fail to match updated subscriber service parameters.

6. The method of claim 1 wherein a subscriber profile specifies the subscriber service parameters for each subscriber, the subscriber profiles being stored on the remote terminals for each subscriber station associated therewith, and wherein issuing the commands from the central provisioning unit to update the subscriber service parameters includes issuing commands for updating the subscriber service parameters stored on one or more of the subscriber profiles.

7. The method of claim 1 wherein a database associated with one or more of the remote terminals includes one or more subscriber profiles, the subscriber profiles specifying subscriber service parameters, and wherein issuing the commands from the central provisioning unit to update the subscriber service parameters includes issuing commands to one or more of the remote terminals to retrieve one or more of the subscriber profiles stored on the database for updating the subscriber service parameters of one or more of the subscriber stations.

8. The method of claim 1 further comprising extracting an element type for each subscriber station requiring updating, and selecting a provisioning protocol for the updated set of subscriber service parameters based on the element type of the updated subscriber station.

9. The method of claim 1 further comprising determining subscriber stations to omit from updating.

10. The method of claim 9 further comprising determining subscriber stations to omit from updating if updates are pending for the subscriber stations.

11. The method of claim 9 further comprising determining subscriber stations to omit from updating if the subscriber stations meet omission criteria.

12. The method of claim 9 further comprising determining subscriber stations to omit from updating when subsequent requests update the same circuit.

13. The method of claim 1 further comprising issuing commands from the central provisioning unit to the remote terminals having subscriber stations requiring updating for determining whether the updating of the subscriber stations is successful.

14. The method of claim 13 further comprising generating an error log at the central processing unit for subscriber stations having unsuccessful updates.

15. The method of claim 14 further comprising re-scheduling updating of the subscriber stations specified in the error log.

16. A method for updating subscriber services in a system having a number of remote terminals associated with a number of subscriber stations, the remote terminals for relaying signals between a network and the subscriber stations according to subscriber service parameters, the method comprising:

extracting subscriber service parameters for a number of subscriber stations with a central provisioning unit;

processing the extracted subscriber service parameters with the central provisioning unit to determine one or more subscriber stations requiring updating; and automatically updating the subscriber service parameters associated with the subscriber stations requiring updating to correspond with the updated subscriber service parameters with commands issued from the central provisioning unit and without requiring manual interaction to associate the updated subscriber service parameters with specific subscriber stations;

wherein each remote terminal includes a port for each subscriber station associated therewith for relaying signals between the communication network and the associated subscriber station, wherein the subscriber service parameters for each subscriber station specify operating characteristics for the port associated therewith, and wherein updating the subscriber service parameters includes updating the operating characteristics of the port associated with each subscriber station requiring updating;

wherein each remote terminal includes a terminal identification (TID) address and is associated with a central office terminal (COT), each COT having a Internet Protocol (IP) address and being configured for relaying signals between the central provisioning unit and the remote terminal associated therewith, wherein each port includes an access identifier (AID), and wherein extracting the subscriber service parameters includes retrieving the AID, TID, and IP address associated with each subscriber station requiring updating and issuing the commands for updating the subscriber service parameters based on the retrieved addresses.

17. The method of claim 16 further comprising grouping subscriber stations requiring updating according to the IP address associated therewith, issuing the commands from the central processing unit to update the subscriber service parameters of one or more of the subscriber stations in a single session between the central provisioning unit and the COT of each IP address having subscriber stations that require updating.

18. A central provisioning unit for updating subscriber services in a system having a number of remote terminals associated with a number of subscriber stations, the remote terminals for relaying signals between a network and the subscriber stations according to subscriber service parameters, the central provisioning unit configured for:

extracting subscriber service parameters for a number of subscriber stations;

processing the extracted subscriber service parameters to determine one or more subscriber stations requiring updating; and automatically updating the subscriber service parameters of the subscriber stations associated with the subscriber stations requiring updating to correspond with the updated subscriber service parameters with commands issued from the central provisioning unit and without requiring manual interaction to associate the updated subscriber service parameters with specific subscriber stations;

wherein each remote terminal includes a port for each subscriber station associated therewith for relaying signals between the communication network and the associated subscriber station, wherein the subscriber service parameters for each subscriber station specify operating characteristics for the port associated therewith, and wherein the central provisioning unit is configured for changing the operating characteristics of the port associated with each subscriber station requiring updating;

wherein the remote terminals each include a number of ports and wherein the central provisioning unit is configured for sequentially updating the subscriber service parameters of each port of one of the remote terminals, wherein the sequential updating is characterized by updating a first portion of the ports and thereafter updating at least a second portion of the ports after a predefined period of time.

19. The central provisioning unit of claim 18 wherein the central provisioning unit is configured for determining the subscriber stations requiring updating if the extracted subscriber service parameters associated therewith fail to match updated subscriber service parameters.

20. The central provisioning unit of claim 18 wherein the central provisioning unit is configured for determining subscriber stations to omit from updating.

21. The central provisioning unit of claim 18 wherein the central provisioning unit is configured for determining whether the updating of the subscriber stations is successful.

22. The central provisioning unit of claim 21 wherein the central provisioning unit is configured for generating an error log at the central processing unit for subscriber stations having unsuccessful updates and for re-scheduling updating of the subscriber stations specified in the error log.

23. A method for updating subscriber services in a system having a number of remote terminals associated with a number of subscriber stations, the remote terminals each including a number of ports for relaying signals between a network and the subscriber stations according to subscriber service parameters, the method comprising:

extracting subscriber service parameters for a number of ports with a central provisioning unit;

processing the extracted subscriber service parameters with the central provisioning unit to determine one or more ports requiring updating;

automatically updating the subscriber service parameters associated with the ports requiring updating to correspond with the updated subscriber service parameters with commands issued from the central provisioning unit and without requiring manual interaction to associate the updated subscriber service parameters with specific subscriber stations;

wherein the subscriber service parameters for each subscriber station specify operating characteristics for the port associated therewith, and wherein undating the subscriber service parameters includes updating the operating characteristics of the port associated with each subscriber station requiring updating;

selectively determining the ports on each remote terminal for updating the subscriber service parameters associated therewith; and sequentially updating the subscriber service parameters of each port of one of the remote terminals, wherein the sequential updating is characterized by updating a first portion of the ports and thereafter updating at least a second portion of the ports after a predefined period of time.

24. The method of claim 23 further comprising automatically selecting the predefined period of time with the central provisioning unit based on an updating interval required for updating the first portion of the ports such that updating of the first portion of the ports is completed before beginning updating of the second portion of the ports.

25. The method of claim 23 wherein automatically updating the subscriber service parameters includes selectively issuing commands from the central provisioning unit for independently updating selected ports of one or more remote terminals.

* * * * *